US008774719B2

(12) United States Patent
Kumar

(10) Patent No.: US 8,774,719 B2
(45) Date of Patent: Jul. 8, 2014

(54) SYSTEM AND METHOD FOR WLAN AND SCO BLUETOOTH COEXISTENCE

(75) Inventor: Rajeev Kumar, Jharkhand (IN)

(73) Assignee: Qualcomm Incorporated, San Diego, CA (US)

( * ) Notice: Subject to any disclaimer, the term of this patent is extended or adjusted under 35 U.S.C. 154(b) by 144 days.

(21) Appl. No.: 13/448,252

(22) Filed: Apr. 16, 2012

(65) Prior Publication Data
US 2013/0273848 A1 Oct. 17, 2013

(51) Int. Cl.
*H04B 7/00* (2006.01)

(52) U.S. Cl.
USPC .............. 455/41.2; 455/67.11; 455/67.13; 455/226.1; 370/338

(58) Field of Classification Search
USPC ............ 455/41.2, 67.11, 67.13, 226.1, 226.2, 455/115.1; 370/338, 252, 329, 241
See application file for complete search history.

(56) References Cited

U.S. PATENT DOCUMENTS

| | | | |
|---|---|---|---|
| 7,710,930 B2 * | 5/2010 | Kwak | 370/338 |
| 8,165,102 B1 * | 4/2012 | Vleugels et al. | 370/338 |
| 8,265,051 B2 * | 9/2012 | Kwak | 370/338 |
| 8,493,992 B2 * | 7/2013 | Sella et al. | 370/445 |
| 8,547,853 B2 * | 10/2013 | Du et al. | 370/241 |
| 2005/0009565 A1 * | 1/2005 | Kwak | 455/561 |
| 2007/0281617 A1 | 12/2007 | Meylan et al. | |
| 2009/0137206 A1 | 5/2009 | Sherman et al. | |
| 2009/0285167 A1 * | 11/2009 | Hirsch et al. | 370/329 |
| 2011/0188391 A1 * | 8/2011 | Sella et al. | 370/252 |
| 2013/0208667 A1 * | 8/2013 | Merlin et al. | 370/329 |
| 2013/0235720 A1 * | 9/2013 | Wang et al. | 370/229 |
| 2013/0279391 A1 * | 10/2013 | Gupta et al. | 370/312 |

OTHER PUBLICATIONS

International Search Report and Written Opinion—PCT/US2013/036551—ISA/EPO—Jul. 16, 2013.

* cited by examiner

*Primary Examiner* — Minh D Dao
(74) *Attorney, Agent, or Firm* — Bay Area Technology Law Group PC

(57) ABSTRACT

In a wireless communication device having collocated Bluetooth and WLAN systems, wireless communication in a device having Bluetooth and WLAN systems, the device monitors for beacon transmission from an access point for a threshold number of access point beacon intervals when an SCO Bluetooth link is active. Once a threshold number of beacon intervals have passed without receiving a beacon transmission from the access point, the WLAN module sends a PS-Poll message to the access point to maintain the link and so that any queued data for the device can be transmitted.

18 Claims, 1 Drawing Sheet

SYSTEM AND METHOD FOR WLAN AND SCO BLUETOOTH COEXISTENCE

FIELD OF THE PRESENT INVENTION

This disclosure generally relates to wireless communication systems and more specifically to systems and methods for providing coexistence in a device having Bluetooth and WLAN systems.

BACKGROUND OF THE INVENTION

The recent proliferation of devices employing wireless communication technologies has resulted in the inclusion of multiple systems in a single device. For example, Bluetooth and wireless local area network (WLAN) communication systems are often implemented in a single device. As will be discussed below, careful design must be employed to minimize conflicts and improve the quality of service.

Bluetooth is a short-range communication protocol and is often used to connect and exchange information between mobile phones, computers, digital cameras, wireless headsets, speakers, keyboards, mice or other input peripherals, and similar devices. Bluetooth allows for the creation of a personal area network (PAN) between a master and up to seven slaves and has an operating range of approximately ten meters. For many Bluetooth applications, it is necessary to ensure the uninterrupted delivery of correctly ordered data packets.

Similarly, WLAN systems may utilize any of the medium-range communication protocols in the IEEE 802.11 family of standards and are typically directed to larger networks. WLAN communications provide relatively high data rates over relatively long distances, offering an easy interface to existing network infrastructures. As such, the nature of a significant portion of WLAN traffic makes it less susceptible to packet order and delivery time problems.

Since Bluetooth and WLAN systems have different characteristics, it is often desirable to provide both functionalities. Despite the advantages of providing Bluetooth and WLAN functionalities in a single device, careful design is required to minimize interference and improve the quality of service. Although WLAN communications operate on an asynchronous protocol and access the wireless medium using a Carrier Sense Multiple Access/Collision Avoidance (CSMA/CA) mechanisms while Bluetooth communications rely on time division multiplex access (TDMA) mechanisms, both share the 2.4 GHz Industrial, Scientific and Medical Device band (ISM) band. As a result, interference between the two communications systems can occur.

This problem is exacerbated by the physical collocation of the systems if both are implemented in a single device. When the Bluetooth and WLAN devices are collocated, a signal transmitted from one device may saturate a low noise amplifier (LNA) in a receiver of the other device, then causing the receiver to be desensitized. For example, if the Bluetooth module is receiving a packet at the same time that the WLAN module is transmitting, then the transmit power of the WLAN module may spill into the receiver of the Bluetooth module and desensitize the receiver. The desensitization of the receiver may cause degradation in performance, loss of data, failure in communication, and/or other deleterious effects.

Collocation of these devices may entail using the same antenna, being located on the same circuit board or coupled circuit boards, being located on the same integrated circuit chip or coupled chip sets, being located within the same apparatus (e.g., a laptop computer or a mobile device), or any combination thereof. For example, a current trend is the move from each system being carried on separate integrated circuits to merging as many functions as possible onto a single integrated circuit in system on a chip (SOC) implementations. If the collocated devices are both operational, then there is an approximately 28% chance that a Bluetooth transmission will be sent on the frequency channel used by the WLAN device, causing interference with the WLAN transmission or vice versa.

To prevent such interference between collocated WLAN and Bluetooth systems, arbitration schemes are often employed to schedule transmissions to prevent or minimize simultaneous operation. Although arbitration can help minimize interference, there may be significant consequences to the operation of the affected systems. This is particularly true when the nature of the communications link involving one of the systems is associated with an enhanced priority. For example, to maintain sufficient quality for the transmission of voice traffic over Bluetooth, a synchronous connection-oriented (SCO) link may be employed. To guarantee adequate bandwidth, an SCO link reserves specific time slots that are dedicated to the SCO traffic. As a result, other wireless communication systems such as WLAN may be relegated to the unreserved time slots during SCO operation, which may prevent proper operation of WLAN.

Accordingly, what has been needed is a system and method for implementing WLAN and Bluetooth communications that minimizes interference. It would be desirable to provide systems and methods for maintaining the performance of one wireless communication system even while another wireless system is given priority. This invention accomplishes these and other goals.

SUMMARY OF THE INVENTION

In accordance with the above needs and those that will be mentioned and will become apparent below, this disclosure discloses a method for wireless communication in a device having Bluetooth and WLAN systems, comprising determining the existence of an SCO Bluetooth link, monitoring WLAN receptions for a beacon transmission from an access point for a threshold number of access point beacon intervals, and sending a PS-Poll message to the access point after the threshold number of beacon intervals has passed without receiving a beacon transmission from the access point when the SCO Bluetooth link is active. Preferably, the threshold number of beacon intervals is in the range of approximately 3 to 7.

In one aspect, the method includes monitoring for beacon transmissions occurs during time slots unused by the SCO Bluetooth link. Preferably, the beacon transmission has a length exceeding time slots unused by the SCO Bluetooth link in an SCO interval. More preferably, the beacon transmission is a FAT beacon having a length greater than approximately 350 bytes.

In another aspect, the access point beacon interval is determined from a beacon transmission received prior to establishment of the SCO Bluetooth link.

The method may also include reinitiating monitoring WLAN receptions for a beacon transmission after sending the PS-Poll message and receiving a response from the access point.

Also preferably, operation of the Bluetooth and WLAN systems are arbitrated based upon a characteristic of the communication.

This disclosure also discloses a device for wireless communications having Bluetooth and WLAN modules, including an arbitration module for controlling the Bluetooth and WLAN modules that allows operation of the WLAN module during time slots unused by an SCO Bluetooth link, wherein the WLAN module is configured to monitor WLAN receptions for a threshold number of access point beacon intervals when the SCO Bluetooth link is established and send a PS-Poll message to the access point after the threshold number of beacon intervals has passed without receiving a beacon transmission from the access point when the SCO Bluetooth link is active. Preferably, the threshold number of beacon intervals is in the range of approximately 3 to 7.

In one embodiment, a WLAN module is configured to monitor for beacon transmissions during time slots unused by the SCO Bluetooth link. Preferably, the beacon transmission has a length exceeding time slots unused by the SCO Bluetooth link in an SCO interval. Also preferably, the beacon transmission is a FAT beacon having a length greater than approximately 350 bytes.

Yet another aspect discloses a WLAN module that is configured to determine the access point beacon interval from a beacon transmission received prior to establishment of the SCO Bluetooth link.

In another embodiment, the WLAN module is configured to reinitiate monitoring WLAN receptions for a beacon transmission after sending the PS-Poll message and receiving a response from the access point.

Preferably, the arbitration module controls operation of the Bluetooth and WLAN systems based upon a characteristic of the communication. Also preferably, the WLAN module is configured to obtain information regarding the SCO Bluetooth link from the arbitration module.

This disclosure also discloses a computer-readable medium including instructions stored thereon, for use in controlling the operation of a WLAN module in a wireless communication device having collocated Bluetooth and WLAN systems including a first instruction set for determining the existence of an SCO Bluetooth link, a second instruction set for monitoring WLAN receptions for a beacon transmission from an access point for a threshold number of access point beacon intervals, and a third instruction set for sending a PS-Poll message to the access point after the threshold number of beacon intervals has passed without receiving a beacon transmission from the access point when the SCO Bluetooth link is active.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
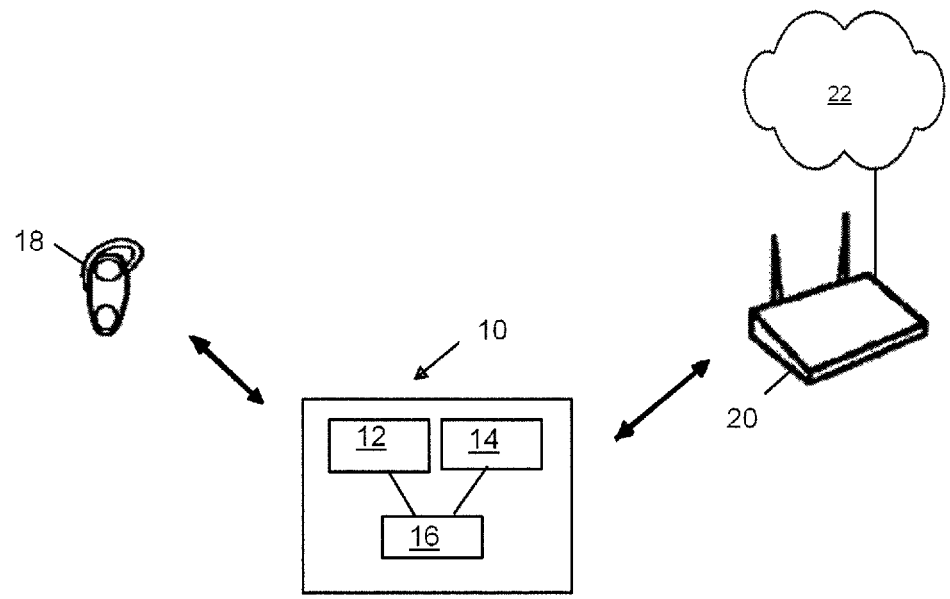
FIG. 1 is a schematic diagram of a wireless device having collocated Bluetooth and WLAN systems, according to one embodiment of the invention.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), and flash memory or any other medium that can be used to store the desired information.

Further, embodiments are discussed in specific reference to wireless networks. As such, this disclosure is applicable to any suitable wireless communication systems having the necessary characteristics. Although discussed in specific reference to WLAN and Bluetooth systems, the techniques of this disclosure may be applied to other wireless communication systems that suffer from conflicts resulting from the operation of the systems.

In the figures, a single block may be described as performing a function or functions; however, in actual practice, the function or functions perfoi Hied by that block may be performed in a single component or across multiple components, and/or may be performed using hardware, using software, or using a combination of hardware and software. Also, the exemplary wireless network devices may include components other than those shown, including well-known components such as a processor, memory and the like.

The techniques described herein may be implemented in hardware, software, firmware, or any combination thereof. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a", "an" and "the" include plural referents unless the content clearly dictates otherwise.

As shown in FIG. 1, a client wireless device 10 having a Bluetooth module 12 and a WLAN module 14 configured to communicate using a suitable IEEE 802.11 standard. An arbitration module 16 controls operation of the Bluetooth module 12 and WLAN module 14 to restrict simultaneous operation of the respective radios and improve coexistence. During operation of device 10, Bluetooth module 12 may participate in a PAN, such as by establishing a communications link with another Bluetooth-enabled device, such as headset 18. Similarly, WLAN module 14 may establish communication through access point (AP) 20 to a broader network 22, such as the Internet or a LAN. As known in the art, arbitration module 16 may give priority to one of the wireless systems in order to maintain a desired quality of service depending upon characteristics of the communications. Nevertheless, it is desirable to actively maintain both links.

Bluetooth systems may be organized using a master-slave relationship employing a time division duplex protocol having defined time slots of 625 μsecs, in which transmission alternates between the master and slave. As noted above, certain types of Bluetooth communications require enhanced quality of service. For example, successful bidirectional transmission of audio information for voice has a relatively low tolerance for packet loss or timing issues. To assure the necessary quality of service, Bluetooth communication systems may employ an SCO link or an Extended SCO (eSCO) link that allows retransmission.

These SCO links may be characterized by a symmetric point-to-point connection between a master and a single slave in which the SCO link is maintained by using reserved slots at regular intervals. Three different types of SCO packets have been established for carrying high quality voice (HV) at a data rate of 64 kbps, occupying every two, four or six time slots, HV1, HV2 and HV3. HV1 and HV2 utilize varying degrees of error correction and consume either all or two-thirds of the available time slots. HV3 is currently the most commonly employed protocol and, because it has no error correction, occupies the minimum bandwidth. Although the use of HV3 packets allows a maximum of three simultaneous voice connections, a typical usage scenario involves one voice connection, requiring two out of every six time slots.

Figure 2:
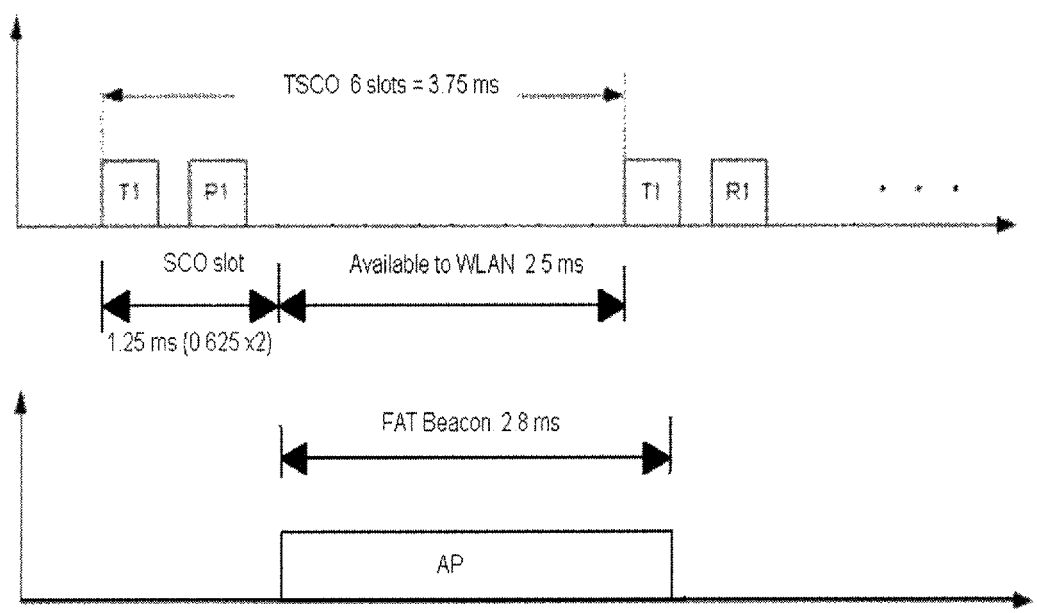
FIG. 2 is a schematic representation of the timing of an SCO Bluetooth link and an access point beacon frame.

FIG. 2 schematically illustrates the organization of a single voice SCO link utilizing HV3 packets. Transmit T1 and receive R1 time slots, each 625 μsecs, occupy 1.25 msec of the repeating 3.75 msec TSCO interval. Assuming arbitration module 16 is configured to protect the SCO link, the remaining 2.5 msec of the TSCO interval represents the maximum time available for WLAN operation. As will become apparent from the discussion below, these conditions may prevent proper operation of the WLAN system.

A typical infrastructure WLAN is managed by the access point, such as AP 20. To coordinate proper functioning of the WLAN, AP 20 utilizes management frames to provide the necessary configuration and operation information. A critical management frame is the beacon frame which includes information such as the beacon interval, time stamp, service set identifier (SSID,) supported rates, capability information and parameter sets. The beacon frame also includes the traffic indication map (TIM) information element that signals the presence of queued data packets available for delivery to the associated clients. This information is book ended by the media access control (MAC) header that includes the necessary source and destination addresses and a verification portion that typically comprises a cyclic redundancy check (CRC) field.

The amount of information carried by the beacon frame may vary depending upon the type of network and AP. For example, as used herein, a "FAT" beacon frame sent by AP 20 is one that is more than approximately 350 bytes in length. At a typical beacon transmission rate of 1 Mbps, a FAT beacon requires approximately 2.8 msec to be fully received. Accordingly, as depicted in FIG. 2, the FAT beacon frame exceeds the unused 2.5 ms that is available to the WLAN system when an SCO link is being maintained by Bluetooth module 12. Regardless of the timing of when AP 20 sends the beacon, client device 10 will never successfully receive the beacon. Since client device 10 does not receive the beacon sent by AP 20 under these conditions, WLAN module 14 will not operate properly. For example, if client device 10 never receives beacon transmissions from AP 20 it may disassociate after a suitable period of time. Further, the TIM IE is used by AP 20 to signal client device 10 that buffered data is awaiting transmission. Because client device 10 never receives the TIM, it cannot respond to AP 20 to initiate the transfer of that data. Other management functions, including synchronization, channel selection and others may also be impaired.

To compensate for these impacts on the WLAN system created by SCO Bluetooth communications, the techniques of this disclosure are directed to allowing WLAN module 14 to communicate with AP 20 even when no beacon frames are received. Once Bluetooth module 12 establishes an SCO link, WLAN module 14 is configured to monitor the number of intervals that have passed without receiving a beacon transmission. Preferably, arbitration module 16 conveys information regarding the status of Bluetooth module 12 to WLAN module 14, including the existence of an SCO link. However, other suitable mechanisms for determining the existence of an SCO link may be employed as desired, such as by identifying the pattern of time slot usage that is characteristic of an SCO link. In some embodiments, the beacon interval is determined based upon a beacon transmission received prior to the establishment of the SCO link. Alternatively, a default beacon interval may be used. After client device 10 determines a threshold number of beacons have been missed based upon the beacon interval, client device 10 is preferably configured to transmit information to AP 20 to facilitate operation.

In a preferred embodiment, client device 10 is configured to send a power save poll (PS-Poll) frame to AP 20 after the threshold number of beacon intervals have elapsed without reception of a beacon frame. A PS-Poll is typically sent in response to reception of a TIM indicating that data is ready for transmission. Thus, if data for client device 10 is queued for transmission at AP 20, receipt of the PS-Poll frame will initiate the transfer and client device 10 can receive such data while maintaining the SCO link. If no data is queued, AP 20 will simply respond with a NULL frame, indicating no data is ready for transmission. Wireless module 14 then preferably reinitiates the counting of missed beacon intervals. In either situation, successful communication with AP 20 indicates the validity of the link.

Preferably, the threshold number of missed beacon transmissions is adjusted to tailor the performance of the client device as desired. For example, the threshold may be set to in the range of approximately 30 to 50 beacon intervals, and preferably approximately 40 beacons, to maintain a high level of power savings and to minimize overhead on the network. Alternatively, the threshold may be set to one or two beacons to ensure a high level of performance in the WLAN communication system. A presently preferred threshold level is in the range of approximately three to seven beacons, and more preferably five missed beacons, which balances power savings with WLAN performance.

The above noted implementations have at least two benefits. First, even if AP 20 does not have data queued for transmission, it responds with a null frame. This provides client device 10 with an indication that the WLAN link is still active and valid and should not be torn down. Second, included in the AP's beacon transmission is the TIM information element. As noted, the TIM is used to signal to client device 10 in power save mode that AP 20 has data ready for transmission. Since client device 10 with an active SCO Bluetooth link will not receive beacons from AP 20 as discussed above, it will also fail to receive the TIM. By sending a PS-Poll after a threshold number of missed beacon transmissions, client device 10 compensates for missing the TIM in the beacon. Specifically, if unicast data is waiting for the client, AP 20 will send it in response to the PS-Poll. WLAN traffic is still limited to the intervals determined by the SCO link, so Bluetooth traffic will not be degraded by using these techniques.

Described herein are presently preferred embodiments. However, one skilled in the art that pertains to the present invention will understand that the principles of this disclosure can be extended easily with appropriate modifications to other applications. For example, although the noted embodiments are discussed in reference to Bluetooth and WLAN systems, these teachings may be applied to any wireless device having multiple communication systems, wherein the existence of a specific communications link involving one of the systems prevents the reception of regularly scheduled transmissions from another system.

What is claimed is:

1. A method for wireless communication in a device having Bluetooth and wireless local area network (WLAN) modules, comprising:
   determining existence of a synchronous connection-oriented (SCO) Bluetooth link;
   monitoring WLAN receptions for a beacon transmission from an access point for a threshold number of access point beacon intervals; and
   sending a power save poll (PS-Poll) message to the access point after the threshold number of access point beacon intervals has passed without receiving a beacon transmission from the access point when the SCO Bluetooth link is active.

2. The method of claim 1, wherein the threshold number of access point beacon intervals is in the range of approximately 3 to 7.

3. The method of claim 1, wherein the monitoring for beacon transmissions occurs during time slots unused by the SCO Bluetooth link 4. The method of claim 1 wherein the beacon transmission has a length exceeding time slots unused by the SCO Bluetooth link in an SCO interval.

5. The method of claim 4, wherein the beacon transmission is a FAT beacon having a length greater than approximately 350 bytes.

6. The method of claim 1, further comprising determining an access point beacon interval for the threshold number of access point beacon intervals from a beacon transmission received prior to establishment of the SCO Bluetooth.

7. The method of claim 1, further comprising reinitiating monitoring WLAN receptions for a beacon transmission after sending the PS-Poll message and receiving a response from the access point.

8. The method of claim 1, wherein operations of the Bluetooth and WLAN systems are arbitrated based upon a characteristic of the communication.

9. A device for wireless communications having Bluetooth and wireless local area network (WLAN) modules, comprising an arbitration module controlling the Bluetooth and WLAN modules that allows operation of the WLAN module during time slots unused by a synchronous connection-oriented (SCO) Bluetooth link, wherein the WLAN module is configured to monitor WLAN receptions for a threshold number of access point beacon intervals when the SCO Bluetooth link is established and send a power save poll (PS-Poll) message to an access point after the threshold number of access point beacon intervals has passed without receiving a beacon transmission from the access point when the SCO Bluetooth link is active.

10. The device of claim 9, wherein the threshold number of access point beacon intervals is in the range of approximately 3 to 7.

11. The device of claim 9, wherein the WLAN module is configured to monitor for beacon transmissions during time slots unused by the SCO Bluetooth link.

12. The device of claim 9, wherein the beacon transmission has a length exceeding time slots unused by the SCO Bluetooth link in an SCO interval.

13. The device of claim 12, wherein the beacon transmission is a FAT beacon having a length greater than approximately 350 bytes.

14. The device of claim 9, wherein the WLAN module is configured to determine an access point beacon interval for the threshold number of access point beacon intervals from a beacon transmission received prior to establishment of the SCO Bluetooth link.

15. The device of claim 9, wherein the WLAN module is configured to reinitiate monitoring WLAN receptions for a beacon transmission after sending the PS-Poll message and receiving a response from the access point.

16. The device of claim 9, wherein the arbitration module controls operation of the Bluetooth and WLAN systems based upon a characteristic of the communication.

17. The device of claim 16, wherein the WLAN module is configured to obtain information regarding the SCO Bluetooth link from the arbitration module.

18. A non-transitory computer-readable storage medium for a wireless communication device having instructions stored thereon, for use in controlling the operation of a wireless local area network (WLAN) module in the wireless communication device having collocated Bluetooth and WLAN systems comprising:

a first instruction set for determining existence of a synchronous connection-oriented (SCO) Bluetooth link;

a second instruction set for monitoring WLAN receptions for a beacon transmission from an access point for a threshold number of access point beacon intervals; and a third instruction set for sending a power save poll (PS-Poll) message to the access point after the threshold number of access point beacon intervals has passed without receiving a beacon transmission from the access point when the SCO Bluetooth link is active.

* * * * *